000
United States Patent
Lee

(10) Patent No.: US 10,326,511 B1
(45) Date of Patent: Jun. 18, 2019

(54) APPARATUS AND METHOD OF NON-ITERATIVE SINGULAR-VALUE DECOMPOSITION

(71) Applicant: Samsung Electronics Co., Ltd., Gyeonggi-do (KR)

(72) Inventor: Wook Bong Lee, San Jose, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/950,869

(22) Filed: Apr. 11, 2018

Related U.S. Application Data

(60) Provisional application No. 62/616,893, filed on Jan. 12, 2018.

(51) Int. Cl.
*H04B 7/06* (2006.01)
*H04B 7/0456* (2017.01)
(Continued)

(52) U.S. Cl.
CPC ......... *H04B 7/0634* (2013.01); *H04B 7/0456* (2013.01); *H04L 25/0248* (2013.01); *H04B 7/0417* (2013.01)

(58) Field of Classification Search
CPC .. H04B 7/0634; H04B 7/0456; H04B 7/0417; H04L 25/0248
See application file for complete search history.

(56) References Cited

U.S. PATENT DOCUMENTS 7,602,837 B2  10/2009 Kotecha et al.
8,249,002 B2   8/2012 Kuroda
(Continued)

OTHER PUBLICATIONS

US 8,891,702 B2, 11/2014, Mielczarek et al. (withdrawn)
(Continued)

*Primary Examiner* — Vineeta S Panwalkar
(74) *Attorney, Agent, or Firm* — The Farrell Law Firm, P.C.

(57) ABSTRACT

Method for non-iterative singular-value decomposition (SVD). The method includes receiving, by receiver, signal; determining, by channel matrix generator, channel matrix for received signal, where channel matrix has dimension $N_{rx} \times N_{tx}$, $N_{rx}$ is number of receive antennas, $N_{tx}$ is integer indicating number of transmit antennas; reducing, by singular-value decomposer, dimension of channel matrix to $\min(N_{rx},N_{tx}) \times \min(N_{rx},N_{tx})$, where min( ) is function that returns coefficient with minimum value; performing, by singular-value decomposer, SVD on dimension-reduced channel matrix to determine singular vectors and corresponding coefficients that maximize singular values of singular vectors; outputting result of SVD based on at least one of when dimension of dimension-reduced channel matrix is less than or equal to 2 and when two greatest singular values of corresponding singular vectors are determined; when result of SVD not output, subtracting, by singular-value decomposer, singular vectors from dimension-reduced channel matrix to reduce rank and returning to performing SVD.

20 Claims, 5 Drawing Sheets

(51) Int. Cl.
*H04L 25/02* (2006.01)
*H04B 7/0417* (2017.01)

(56) References Cited

U.S. PATENT DOCUMENTS

| | | | |
|---|---|---|---|
| 8,737,518 | B2 | 5/2014 | Tosato |
| 8,831,118 | B2 | 9/2014 | Takano |
| 9,831,934 | B2 | 11/2017 | Kotecha et al. |
| 2007/0124299 | A1* | 5/2007 | Martin ............... G06F 16/31 |
| 2008/0317156 | A1* | 12/2008 | Sivanesan ........... H04B 7/0413 |
| | | | 375/267 |
| 2009/0274229 | A1* | 11/2009 | Mihota ............... H01Q 25/00 |
| | | | 375/260 |
| 2016/0285528 | A1 | 9/2016 | Wang |
| 2016/0342601 | A1 | 11/2016 | Zhang et al. |
| 2017/0141828 | A1 | 5/2017 | Tosato et al. |

OTHER PUBLICATIONS

Gene H. Golub; Charles F. Van Loan; "Matrix Computations", Third Edition, "The Symmetric Eigenvalue Problem", Chapter 8, The Johns Hopkins Univ. Press, pp. 391-469,1996.
http://web.mit.edu/ehliu/Public/sclark/Golub%20G.H.,%20Van%20Loan%20C.F.-%20Matrix%20Computations.pdf.

* cited by examiner

APPARATUS AND METHOD OF NON-ITERATIVE SINGULAR-VALUE DECOMPOSITION

PRIORITY

This application claims priority under 35 U.S.C. § 119(e) to a U.S. Provisional Patent Application filed on Jan. 12, 2018 in the United States Patent and Trademark Office and assigned Ser. No. 62/616,893, the entire contents of which are incorporated herein by reference.

FIELD

The present disclosure relates generally to an apparatus for and a method of non-iterative singular-value decomposition (SVD), and more particularly, to an apparatus for and a method of non-iterative SVD for beamforming.

BACKGROUND

A beamforming feedback block provides a medium access controller (MAC) with compressed beamforming matrices and signal-to-noise-ratio (SNR) estimates for specific data sub-carriers/sub-carrier groups required to support beamforming feedback, as specified in standards of the Institute for Electrical and Electronics Engineers (IEEE), that include IEEE 802.11n standard, IEEE 802.11ac standard, and IEEE 802.11ax standard, for both single-user multiple-input-multiple-output (SU-MIMO) and multi-user MIMO (MU-MIMO). After a Givens rotation (i.e., a rotation in a plane spanned by 2 coordinate axes) or a Householder transformation (i.e., a linear transformation that describes a reflection about a plane or hyperplane containing the origin), a $\min(N_{tx}, N_{rx}) \times \min(N_{tx}, N_{rx})$ SVD operation is required to obtain compressed beamforming matrices, where min( ) is a function that returns the minimum value of the coefficients in question, $N_{tx}$ is a number of transmitting antennas, and $N_{rx}$ is a number of receiving antennas. When a dimension of an SVD is greater than 2, processing is challenging and an iterative process may be required.

SUMMARY

According to an embodiment, a method for non-iterative SVD in a wireless communication system is provided. The method includes receiving, by a receiver, a signal; determining, by a channel matrix generator, a channel matrix for the received signal, where the channel matrix has a dimension of $N_{rx} \times N_{tx}$, where $N_{rx}$ is an integer indicating a number of receive antennas, and $N_{tx}$ is an integer indicating a number of transmit antennas; reducing, by a singular-value decomposer, the dimension of the channel matrix to $\min(N_{rx}, N_{tx}) \times \min(N_{rx}, N_{tx})$, where min( ) is a function that returns a coefficient with a minimum value; performing, by the singular-value decomposer, an SVD on the dimension-reduced channel matrix to determine singular vectors and corresponding coefficients that maximize singular values of the singular vectors; outputting a result of the SVD based on at least one of when the dimension of the dimension-reduced channel matrix is less than or equal to 2 and when two greatest singular values of corresponding singular vectors are determined; and when the result of the SVD is not output, subtracting, by the singular-value decomposer, the singular vectors from the dimension-reduced channel matrix to reduce rank and returning to performing the SVD.

According to an embodiment, an apparatus for non-iterative SVD in a wireless communication system is provided. The apparatus includes a receiver configured to receive a signal; a channel matrix generator configured to determine a channel matrix for the received signal, where the channel matrix has a dimension of $N_{rx} \times N_{tx}$, where $N_{rx}$ is an integer indicating a number of receive antennas, and $N_{tx}$ is an integer indicating a number of transmit antennas; and a singular-value decomposer configured to reduce the dimension of the channel matrix to $\min(N_{rx}, N_{tx}) \times \min(N_{rx}, N_{tx})$, where min( ) is a function that returns a coefficient with a minimum value; perform an SVD on the dimension-reduced channel matrix to determine singular vectors and corresponding coefficients that maximize singular values of the singular vectors; output a result of the SVD based on at least one of when the dimension of the dimension-reduced channel matrix is less than or equal to 2 and when two greatest singular values of corresponding singular vectors are determined occurs; and when the result of the SVD is not output, subtract the singular vectors from the dimension-reduced channel matrix to reduce rank and returning to performing the SVD.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
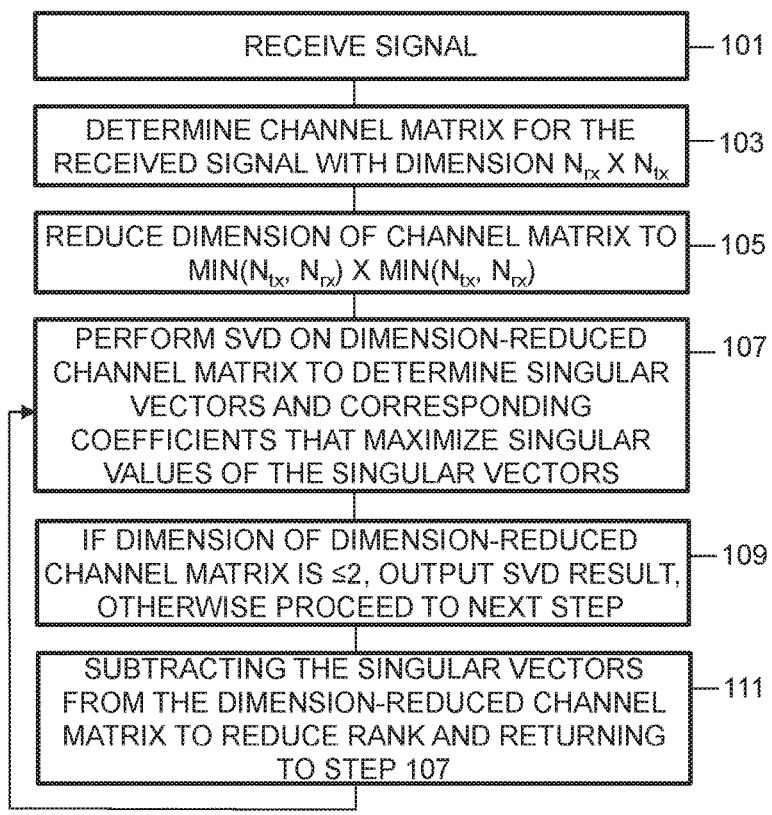
FIG. 1 is a flowchart of a method of non-iterative SVD, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The present disclosure concerns an apparatus for and a method of non-iterative SVD. As an example, the present disclosure applies non-iterative SVD to beamforming. However, the present disclosure is not limited to applying non-iterative SVD to beamforming but may apply non-iterative SVD to any application to which non-iterative SVD is applicable.

FIG. 1 is a flowchart of a method of non-iterative SVD in a wireless communication system, according to an embodiment.

Referring to FIG. 1, at 101, the present system receives a signal.

At 103, the present system determines a channel matrix for the received signal, where the dimension of the channel matrix is $N_{rx} \times N_{tx}$, where $N_{rx}$ is an integer indicating a number of receive antennas, and $N_{tx}$ is an integer indicating a number of transmit antennas.

At 105, the present system reduces the dimension of the channel matrix to $\min(N_{tx}, N_{rx}) \times \min(N_{tx}, N_{rx})$.

At 107, the present system performs SVD on the dimension-reduced channel matrix to determine singular vectors and corresponding coefficients that maximize singular values of the singular vectors.

At 109, the present system outputs the result of the SVD if one of the dimension of the dimension-reduced channel matrix is less than or equal to 2 and two greatest singular values of corresponding singular vectors are determined occurs. Otherwise, proceed to 111.

At 111, the present system subtracts the singular vectors from the dimension-reduced channel matrix to reduce the rank of the channel matrix and return to 107 for further processing.

Figure 2:
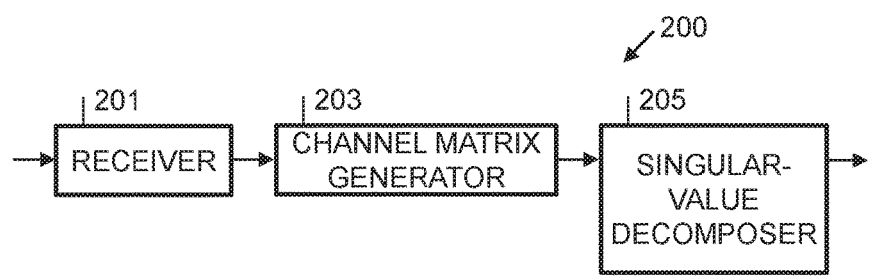
FIG. 2 is a block diagram of an apparatus for non-iterative SVD, according to an embodiment.

FIG. 2 is a block diagram of an apparatus 200 for non-iterative SVD in a wireless communication system, according to an embodiment.

Referring to FIG. 2, the apparatus 200 includes a receiver 201, a channel matrix generator 203, and a singular-value decomposer 205.

The receiver 201 includes an input at which a signal is received, and an output.

The channel matrix generator 203 includes an input connected to the output of the receiver 201, and an output. The channel matrix generator 203 determines a channel matrix for the received signal, where the dimension of the channel matrix is $N_{rx} \times N_{tx}$, where $N_{rx}$ is an integer indicating a number of receive antennas, and $N_{tx}$ is an integer indicating a number of transmit antennas.

The singular-value decomposer 205 includes an input connected to the output of the channel matrix generator 203, and an output. The singular-value decomposer 205 reduces the dimension of the channel matrix to $\min(N_{tx}, N_{rx}) \times \min(N_{tx}, N_{rx})$, performs an SVD on the dimension-reduced channel matrix to determine singular vectors and corresponding coefficients that maximize singular values of the singular vectors. If the dimension of the dimension-reduced channel matrix is less than or equal to 2 or two greatest singular values of corresponding singular vectors are determined then the result of the SVD is output. Otherwise, if the dimension of the dimension-reduced channel matrix is greater than 2, the singular vectors are subtracted from the dimension-reduced channel matrix to reduce the rank of the channel matrix and the result is further processed until the dimension of the dimension-reduced channel matrix is less than or equal to 2.

Figure 3:
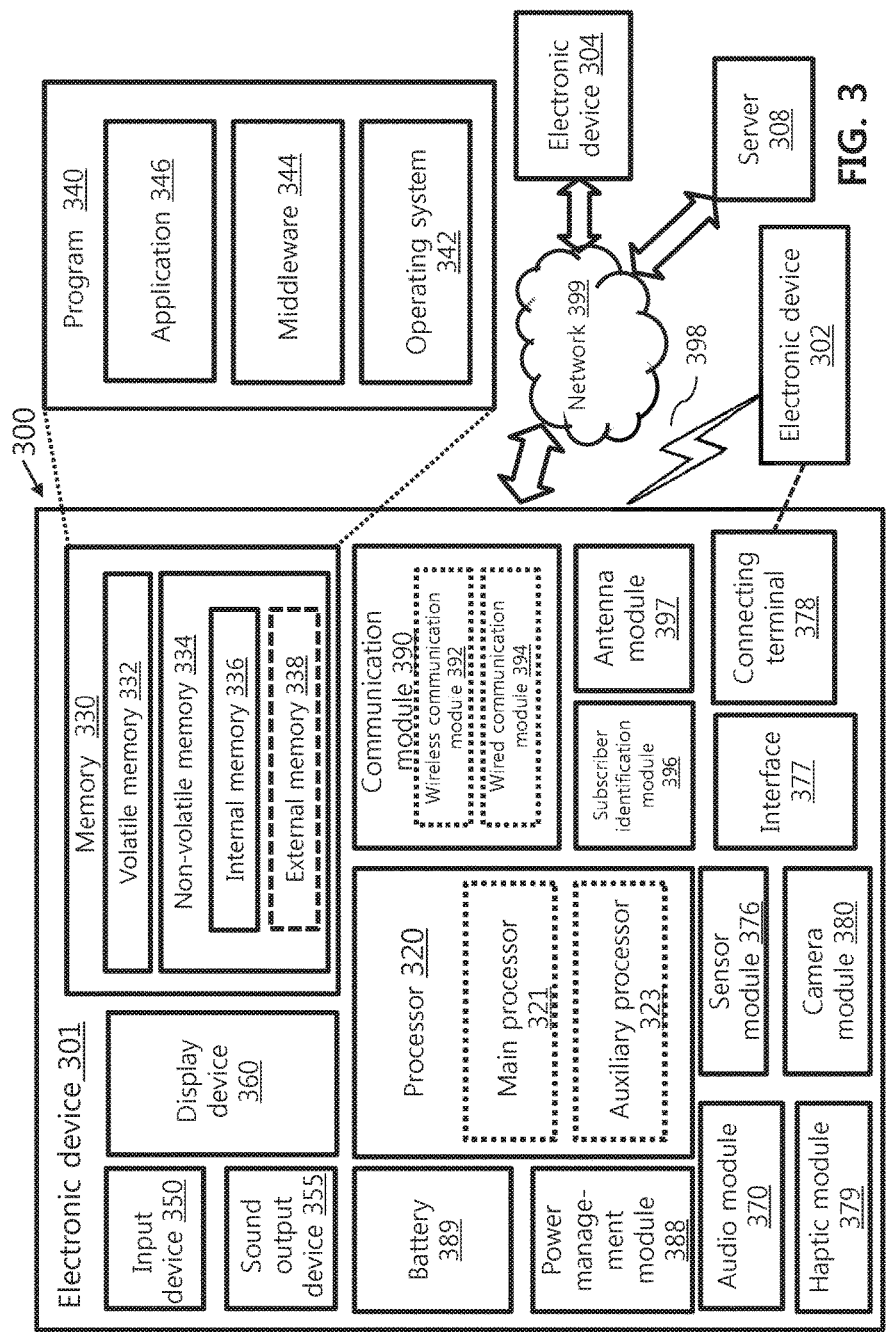
FIG. 3 is a block diagram of an electronic device in a network environment, according to an embodiment.

FIG. 3 is a block diagram of an electronic device 301 in a network environment 300, according to an embodiment.

Referring to FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). According to an embodiment, the electronic device 301 may communicate with the electronic device 304 via the server 308. The electronic device 301 may include a processor 320, a memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In an embodiment, at least one (e.g., the display device 360 or the camera module 380) of the components may be omitted from the electronic device 301, or one or more other components may be added to the electronic device 301. In an embodiment, some of the components may be implemented as a single integrated circuit (IC). For example, the sensor module 376 (e.g., a fingerprint sensor, an iris sensor, or an illuminance sensor) may be embedded in the display device 360 (e.g., a display).

The processor 320 may execute, for example, software (e.g., a program 340) to control at least one other component (e.g., a hardware or a software component) of the electronic device 301 coupled with the processor 320, and may perform various data processing or computations. According to an embodiment, as at least part of the data processing or computations, the processor 320 may load a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or execute a particular function. The auxiliary processor 323 may be implemented as being separate from, or a part of, the main processor 321.

The auxiliary processor 323 may control at least some of the functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thererto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by other component (e.g., the processor 320) of the electronic device 301, from the outside (e.g., a user) of the electronic device 301. The input device 350 may include, for example, a microphone, a mouse, or a keyboard.

The sound output device 355 may output sound signals to the outside of the electronic device 301. The sound output device 355 may include, for example, a speaker or a receiver. The speaker may be used for general purposes, such as playing multimedia or recording, and the receiver may be used for receiving an incoming call. According to an embodiment, the receiver may be implemented as being separate from, or a part of, the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. According to an embodiment, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. According to an embodiment, the audio module 370 may obtain the sound via the input device 350, or output the sound via the sound output device 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, an HDMI connector, a USB connector, an SD card connector, or an audio connector (e.g., a headphone connector).

The haptic module 379 may convert an electrical signal into a mechanical stimulus (e.g., a vibration or a movement) or an electrical stimulus which may be recognized by a user via tactile sensation or kinesthetic sensation. According to an embodiment, the haptic module 379 may include, for example, a motor, a piezoelectric element, or an electrical stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to an embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or a standard of the Infrared Data Association (IrDA)) or the second network 399 (e.g., a long-range communication network, such as a cellular network, the Internet, or a computer network (e.g., LAN or wide area network (WAN))). These various types of communication modules may be implemented as a single component (e.g., a single IC), or may be implemented as multiple components (e.g., multiple ICs) that are separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to an embodiment, the antenna module 397 may include one or more antennas, and, therefrom, at least one antenna appropriate for a communication scheme used in the communication network, such as the first network 398 or the second network 399, may be selected, for example, by the communication module 390 (e.g., the wireless communication module 392). The signal or the power may then be transmitted or received between the communication module 390 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to an embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

The electronic device according to an embodiment may be one of various types of electronic devices. The electronic devices may include, for example, a portable communication device (e.g., a smart phone), a computer, a portable multimedia device, a portable medical device, a camera, a wearable device, or a home appliance. According to an embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to an embodiment, a module may be implemented in a form of an application-specific integrated circuit (ASIC).

An embodiment may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. Wherein, the term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 4:
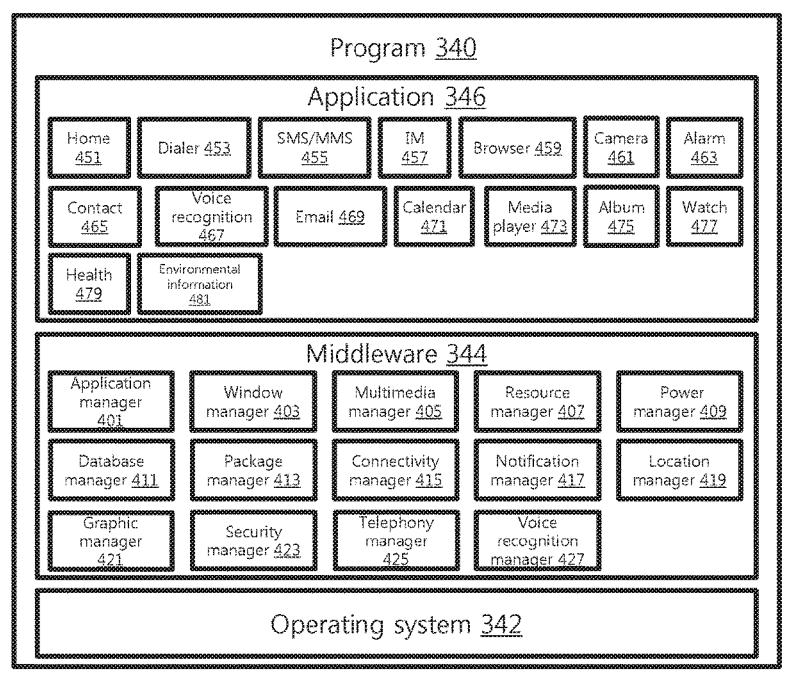
FIG. 4 is a block diagram of a program, according to an embodiment.

FIG. 4 is a block diagram of the program 340 according to an embodiment.

Referring to FIG. 4, the program 340 may include an operating system (OS) 342 to control one or more resources of the electronic device 301, middleware 344, or an application 346 executable in the OS 342. The OS 342 may include, for example, Android®, iOS®, Windows®, Symbian®, Tizen®, or Bada™. At least part of the program 340, for example, may be pre-loaded on the electronic device 301 during manufacture, or may be downloaded from or updated by an external electronic device (e.g., the electronic device 302 or 304, or the server 308) during use by a user.

The OS 342 may control management (e.g., allocating or deallocation) of one or more system resources (e.g., process, memory, or power source) of the electronic device 301. The OS 342, additionally or alternatively, may include one or more driver programs to drive other hardware devices of the electronic device 301, for example, the input device 350, the sound output device 355, the display device 360, the audio module 370, the sensor module 376, the interface 377, the haptic module 379, the camera module 380, the power management module 388, the battery 389, the communication module 390, the subscriber identification module 396, or the antenna module 397.

The middleware 344 may provide various functions to the application 346 such that a function or information provided from one or more resources of the electronic device 301 may be used by the application 346. The middleware 344 may include, for example, an application manager 401, a window manager 403, a multimedia manager 405, a resource manager 407, a power manager 409, a database manager 411, a package manager 413, a connectivity manager 415, a notification manager 417, a location manager 419, a graphic manager 421, a security manager 423, a telephony manager 425, or a voice recognition manager 427.

The application manager 401, for example, may manage the life cycle of the application 346. The window manager 403, for example, may manage one or more graphical user interface (GUI) resources that are used on a screen. The multimedia manager 405, for example, may identify one or more formats to be used to play media files, and may encode or decode a corresponding one of the media files using a codec appropriate for a corresponding format selected from the one or more formats. The resource manager 407, for example, may manage the source code of the application 346 or a memory space of the memory 330. The power manager 409, for example, may manage the capacity, temperature, or power of the battery 389, and determine or provide related information to be used for the operation of the electronic device 301 based at least in part on corresponding information of the capacity, temperature, or power of the battery 389. According to an embodiment, the power manager 409 may interoperate with a basic input/output system (BIOS) of the electronic device 301.

The database manager 411, for example, may generate, search, or change a database to be used by the application 346. The package manager 413, for example, may manage installation or update of an application that is distributed in the form of a package file. The connectivity manager 415, for example, may manage a wireless connection or a direct connection between the electronic device 301 and the external electronic device. The notification manager 417, for example, may provide a function to notify a user of an occurrence of a specified event (e.g., an incoming call, message, or alert). The location manager 419, for example, may manage locational information on the electronic device 301. The graphic manager 421, for example, may manage one or more graphic effects to be offered to a user or a user interface related to the one or more graphic effects.

The security manager 423, for example, may provide system security or user authentication. The telephony manager 425, for example, may manage a voice call function or a video call function provided by the electronic device 301. The voice recognition manager 427, for example, may transmit a user's voice data to the server 308, and receive, from the server 308, a command corresponding to a function to be executed on the electronic device 301 based at least in part on the voice data, or text data converted based at least in part on the voice data. According to an embodiment, the middleware 344 may dynamically delete some existing components or add new components. According to an embodiment, at least part of the middleware 344 may be included as part of the OS 342 or may be implemented in other software separate from the OS 342.

The application 346 may include, for example, a home application 451, a dialer application 453, a short message service (SMS)/multimedia messaging service (MMS) application 455, an instant message (IM) application 457, a browser application 459, a camera application 461, an alarm application 463, a contact application 465, a voice recognition application 467, an email application 469, a calendar application 471, a media player application 473, an album application 475, a watch application 477, a health application 479 (e.g., for measuring the degree of workout or biometric information, such as blood sugar), or an environmental information application 481 (e.g., for measuring air pressure, humidity, or temperature information). According to an embodiment, the application 346 may further include an information exchanging application that is capable of supporting information exchange between the electronic device 301 and the external electronic device. The information exchange application, for example, may include a notification relay application adapted to transfer designated information (e.g., a call, a message, or an alert) to the external electronic device or a device management application adapted to manage the external electronic device. The notification relay application may transfer notification information corresponding to an occurrence of a specified event (e.g., receipt of an email) at another application (e.g., the email application 469) of the electronic device 301 to the external electronic device. Additionally or alternatively, the notification relay application may receive notification information from the external electronic device and provide the notification information to a user of the electronic device 301.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 5:
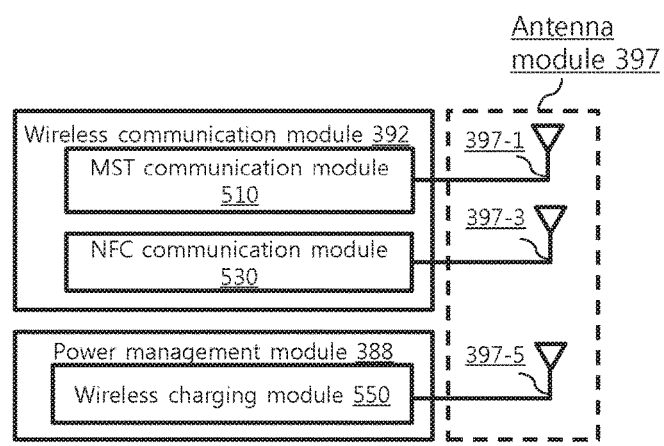
FIG. 5 is a block diagram of a wireless communication module, a power management module, and an antenna module of an electronic device, according to an embodiment.

FIG. 5 is a block diagram of the wireless communication module 392, the power management module 388, and the antenna module 397 of the electronic device 301, according to an embodiment.

Referring to FIG. 5, the wireless communication module 392 may include a magnetic secure transmission (MST) communication module 510 or a near-field communication (NFC) module 530, and the power management module 388 may include a wireless charging module 550. In this case, the antenna module 397 may include a plurality of antennas that include an MST antenna 397-1 connected with the MST communication module 510, an NFC antenna 397-3 connected with the NFC communication module 530, and a wireless charging antenna 397-5 connected with the wireless charging module 550. Descriptions of components described above with regard to FIG. 3 are either briefly described or omitted here.

The MST communication module 510 may receive a signal containing control information or payment information such as card (e.g., credit card) information from the processor 320, generate a magnetic signal corresponding to the received signal, and then transfer the generated magnetic signal to the external electronic device 302 (e.g., a point-of-sale (POS) device) via the MST antenna 397-1. To generate the magnetic signal, according to an embodiment, the MST communication module 510 may include a switching module that includes one or more switches connected with the MST antenna 397-1, and control the switching module to change the direction of voltage or current supplied to the MST antenna 397-1 according to the received signal. The change of the direction of the voltage or current allows the direction of the magnetic signal (e.g., a magnetic field) emitted from the MST antenna 397-1 to change accordingly. If detected at the external electronic device 302, the magnetic signal with its direction changing may cause an effect (e.g., a waveform) similar to that of a magnetic field that is generated when a magnetic card corresponding to the card information associated with the received signal is swiped through a card reader of the electronic device 302. According to an embodiment, for example, payment-related information and a control signal that are received by the electronic device 302 in the form of the magnetic signal may be further transmitted to an external server 308 (e.g., a payment server) via the network 399.

The NFC communication module 530 may obtain a signal containing control information or payment information such as card information from the processor 320 and transmit the obtained signal to the external electronic device 302 via the NFC antenna 397-3. According to an embodiment, the NFC communication module 530 may receive such a signal transmitted from the external electronic device 302 via the NFC antenna 397-3.

The wireless charging module 550 may wirelessly transmit power to the external electronic device 302 (e.g., a cellular phone or wearable device) via the wireless charging antenna 397-5, or wirelessly receive power from the external electronic device 302 (e.g., a wireless charging device). The wireless charging module 550 may support one or more of various wireless charging schemes including, for example, a magnetic resonance scheme or a magnetic induction scheme.

According to an embodiment, some of the MST antenna 397-1, the NFC antenna 397-3, or the wireless charging antenna 397-5 may share at least part of their radiators. For example, the radiator of the MST antenna 397-1 may be used as the radiator of the NFC antenna 397-3 or the wireless charging antenna 397-5, or vice versa. In this case, the antenna module 397 may include a switching circuit adapted to selectively connect (e.g., close) or disconnect (e.g., open) at least part of the antennas 397-1, 397-3, and 397-5, for example, under control of the wireless communication module 392 (e.g., the MST communication module 510 or the NFC communication module 530) or the power management module (e.g., the wireless charging module 550). For example, when the electronic device 301 uses a wireless charging function, the NFC communication module 530 or the wireless charging module 550 may control the switching circuit to temporarily disconnect at least one portion of the radiators shared by the NFC antenna 397-3 and the wireless charging antenna 397-5 from the NFC antenna 397-3 and to connect the at least one portion of the radiators with the wireless charging antenna 397-5.

According to an embodiment, at least one function of the MST communication module 510, the NFC communication module 530, or the wireless charging module 550 may be controlled by an external processor (e.g., the processor 320). According to an embodiment, at least one specified function (e.g., a payment function) of the MST communication module 510 or the NFC communication module 530 may be performed in a trusted execution environment (TEE). According to an embodiment, the TEE may form an execution environment in which, for example, at least some designated area of the memory 330 is allocated to be used for performing a function (e.g., a financial transaction or personal information-related function) that requires a relatively high level of security. In this case, access to the at least some designated area of the memory 330 may be restrictively permitted, for example, according to an entity accessing thereto or an application being executed in the TEE.

In an embodiment, singular vectors and corresponding singular values of dimension of an ($N_{rx}$, $N_{tx}$) matrix, where $N_{tx} \geq 4$ and $N_{rx} = 4$, are determined without using an iterative process. In an embodiment, a closed form equation is used which does not require iteration.

In an embodiment, beamforming feedback is computed at a beamformee and feedback to a beamformer for both SU-MIMO and MU-MIMO wireless fidelity (Wi-Fi) operation, where a beamformee is a device that is a target of a beamformer, and where a beamformer is a device that augments a phase shift of its antennas to produce a gain in a particular direction. In an embodiment, after applying a Givens rotation or a Householder transformation, the issue reduces to a $\min(N_{tx}, N_{rx}) \times \min(N_{tx}, N_{rx})$ operation from $N_{rx} \times N_{tx}$. In an embodiment, the operation is divided into smaller operations (e.g., a 2×2 operation that has a closed form solution). In an embodiment, coefficients that maximize a metric are determined. In a case of 3 and 4 streams, after determining 2 vectors as described above, the 2 vectors are subtracted from a modified channel matrix to determine subsequent 1 or 2 vectors. After the subtraction, the remaining procedure is similar to that of finding 1 or 2 vectors. In an embodiment, the present system and method provides a method for 1 and 2 streams for 4 receive antennas. In order to generate a form $$\begin{bmatrix} A & 0 \\ B & C \end{bmatrix} 0 \,,$$

$H(N_{rx} \times N_{tx})$ is first converted into a tall matrix $(N_{tx} \times N_{rx})$ using a Hermitian operation $T=H^H$. This embodiment is based on a Householder transformation, but an embodiment based on a Givens rotation is similar, where both a Householder transformation and a Givens rotation determines A, B and C.

Then, using a Householder transformation ($N_{rx}$ times), generate Equation (1) as follows:

$$HP = [\, M \;\; 0_{4 \times N_{TX}-4}\,] = \begin{bmatrix} A & 0_{2\times 2} \\ B & C \end{bmatrix} 0_{4 \times (N_{tx}-4)} \quad (1)$$

For high SNR, a matrix $V_t$ is determined which maximizes a determinant of $V_t^H M^H M V_t$. Then, a right singular vector may be $$V = P \begin{bmatrix} V_t \\ 0_{(N_{tx}-N_{rx}) \times N_{ss}} \end{bmatrix}.$$

In an embodiment, one or two streams may be received which have a channel matrix of dimension $N_{rx} \times N_{tx}$.

The dimension of the channel matrix may be reduced to a dimension of $\min(N_{tx}, N_{rx}) \times \min(N_{tx}, N_{rx})$ by solving Equation (1) above.

Right singular vectors $v_1$ and $v_2$ may be determined by solving $$svd\left([\, A^H \;\; B^H \,] \begin{bmatrix} A \\ B \end{bmatrix}\right)$$

and svd(C), respectively.

The right singular vectors may be combined to maximize coefficient values of the right singular vectors as in Equations (2) and (3) as follows:

$$R1: \max_{\alpha,\beta} \left\| \begin{bmatrix} A & 0 \\ B & C \end{bmatrix} V_t \right\|^2 = \max_{\alpha,\beta} \left\| \begin{bmatrix} A & 0 \\ B & C \end{bmatrix} \begin{bmatrix} \sqrt{1-a^2}\, v_1 \\ \alpha e^{i\beta_1} v_2 \end{bmatrix} \right\|^2 \quad (2)$$

$$R2: \max_{\alpha,\beta} \left\{ \det \left\| \begin{bmatrix} A & 0 \\ B & C \end{bmatrix} \begin{bmatrix} \sqrt{1-\alpha_1^2}\, v_{1,1} & \sqrt{1-\alpha_2^2}\, v_{1,2} \\ \alpha_1 e^{i\beta_1} v_{2,1} & \alpha_2 e^{i\beta_2} v_{2,2} \end{bmatrix} \right\|^2 \right\} \quad (3)$$

In an embodiment, there may be one stream, and optimizing the coefficient values may be as in Equations (4) and (5) as follows:

$$\max_{\alpha,\beta} \left\| \begin{bmatrix} A & 0 \\ B & C \end{bmatrix} V_t \right\|^2 = \max_{\alpha,\beta} \left\| \begin{bmatrix} A & 0 \\ B & C \end{bmatrix} \begin{bmatrix} \sqrt{1-a^2}\, v_1 \\ \alpha e^{i\beta_1} v_2 \end{bmatrix} \right\|^2 \quad (4)$$

where a is a positive value with $0 \le \alpha \le 1$, $$\max \left\{ \left[ \sqrt{1-\alpha^2}\, v_1^H \;\; \alpha e^{-i\beta} v_2^H \right] \begin{bmatrix} A^H & B^H \\ 0 & C^H \end{bmatrix} \begin{bmatrix} A & 0 \\ B & C \end{bmatrix} \begin{bmatrix} \sqrt{1-a^2}\, v_1 \\ \alpha e^{i\beta} v_2 \end{bmatrix} \right\} = \quad (5)$$

$$\max \left\{ \left[ \sqrt{1-\alpha^2}\, v_1^H \;\; \alpha e^{-i\beta} v_2^H \right] \begin{bmatrix} A^H A + B^H B & B^H C \\ C^H B & C^H C \end{bmatrix} \right.$$

$$\left. \begin{bmatrix} \sqrt{1-a^2}\, v_1 \\ \alpha e^{i\beta} v_2 \end{bmatrix} \right\} = \max \left\{ (1-\alpha^2) v_1^H (A^H A + B^H B) v_1 + \right.$$

$$\left. \alpha^2 v_2^H C^H C v_2 + 2\alpha \sqrt{1-\alpha^2}\, \mathrm{Re}\{ e^{-i\beta} v_2^H C^H B v_1 \} \right\} =$$

$$\max\{(b-a)\alpha^2 + 2c \cdot \alpha \sqrt{1-\alpha^2} + a\}$$

where $v_1$ and $v_2$ are best right singular vectors of $(A^H A + B^H B)$ and C which provide a maximum singular value, where $\alpha$ is a maximum singular value of $(A^H A + B^H B)$, and b is a maximum singular value of $C^H C$. $c = \max\{\mathrm{Re}\{e^{-i\beta} v_2^H C^H B v_1\}\}$, which can be obtained by $\beta = \arg(v_2^H C^H B v_1)$, in this case, $c = |v_2^H C^H B v_1|$. The solution of Equation (5) is $\alpha$, where a derivative of Equation (5) is 0, which are $$\alpha = \sqrt{\frac{d \pm \sqrt{d \cdot f}}{2d}}$$

where $d = (b-a)^2 + 4c^2$, $f = (b-a)^2$. Thus, a maximum a which maximizes Equation (5) may be determined. The corresponding left singular vector and singular value are $U = MV_t / \|MV_t\|$ and $S = U^H M V_t$.

In an embodiment, there may be two streams, and optimizing the coefficient values may be as in Equation (6) as follows:

$$\max_{\alpha_1,\beta_1,\alpha_2,\beta_2} \{\det(V_t^H M^H M V_t)\} = \max \left\{ \det \left( \begin{bmatrix} \sqrt{1-\alpha_1^2}\, v_{1,1}^H & \alpha_1 e^{-i\beta_1} v_{2,1}^H \\ \sqrt{1-\alpha_2^2}\, v_{1,2}^H & \alpha_2 e^{-i\beta_2} v_{2,2}^H \end{bmatrix} \right. \right. \quad (6)$$

$$\left. \left. \begin{bmatrix} A^H A + B^H B & B^H C \\ C^H B & C^H C \end{bmatrix} \begin{bmatrix} \sqrt{1-\alpha_1^2}\, v_{1,1} & \sqrt{1-\alpha_2^2}\, v_{1,2} \\ \alpha_1 e^{i\beta_1} v_{2,1} & \alpha_2 e^{i\beta_2} v_{2,2} \end{bmatrix} \right) \right\} =$$

$$\max \left\{ \begin{array}{l} \left((1-\alpha_1^2) v_{1,1}^H (A^H A + B^H B) v_{1,1} + \right. \\ 2\alpha_1 \sqrt{1-\alpha_1^2}\, \mathrm{Re}\{ e^{-i\beta_1} v_{2,1}^H C^H B v_{1,1} \} + \alpha_1^2 v_{2,1}^H C^H C v_{2,1} \right) \\ \left((1-\alpha_2^2) v_{1,2}^H (A^H A + B^H B) v_{1,2} + \right. \\ 2\alpha_2 \sqrt{1-\alpha_2^2}\, \mathrm{Re}\{ e^{-i\beta_2} v_{2,2}^H C^H B v_{1,2} \} + \alpha_2^2 v_{2,2}^H C^H C v_{2,2} \right) \\ -\left(\alpha_1 \sqrt{1-\alpha_2^2}\, e^{-i\beta_1} v_{2,1}^H C^H B v_{1,2} + \alpha_2 \sqrt{1-\alpha_1^2}\, e^{i\beta_2} v_{1,1}^H B^H C v_{2,2}\right) \\ \left(\alpha_1 \sqrt{1-\alpha_2^2}\, e^{i\beta_1} v_{1,2}^H B^H C v_{2,1} + \alpha_2 \sqrt{1-\alpha_1^2}\, e^{-i\beta_2} v_{2,2}^H C^H B v_{1,1}\right) \end{array} \right\}$$

Finding a solution to Equation (6) is complex. The present system maximizes the first term as the second term only involves cross terms (i.e., $B^H C$). In this case, the present system may separately solve $\alpha_1, \beta_1$ and $\alpha_2, \beta_2$, and again $v_{1,i}$ and $v_{2,i}$ as right singular vectors of $(A^H A + B^H B)$ and C, where there are two choices of $(v_{1,i}, v_{2,i})$. A solution of each combination may be found the same way as in the single stream case described above. Final values of $\alpha$, $\beta$ and $(v_{1,i}, v_{2,i})$ are determined by comparing Equation (6).

After finding $V_t$, $U_t = MV_t/\|MV_t\|$ and $S_t = U_t^H MV_t$ where the number of columns in $U_t$ and $V_t$ is 2. Since $V_t$ is not an exact right singular vector, there may be non-zero values in off-diagonal terms of $S_t$. To eliminate non-zero values, $[u,s,v] = \text{svd}(S_t)$ may be performed, and a final result is $V_t = V_t v$ and $U = U_t u$ with proper normalization. In addition, $S = U^H MV_t$ which is a 2×2 diagonal matrix. After this operation, the present system may apply geometric mean decomposition (GMD) on S to find a diagonal balanced matrix.

In an embodiment, the present system and method may have three or four streams.

To reduce the rank of a channel matric, subtraction may be performed as in Equations (7) and (8) as follows:

$$M = [U_1 \ U_2] = \begin{bmatrix} \Lambda_1 & 0 \\ 0 & \Lambda_2 \end{bmatrix} \begin{bmatrix} V_1^H \\ V_2^H \end{bmatrix} = U_1 \Lambda_1 V_1^H + U_2 \Lambda_2 V_2^H \quad (7)$$

$$M_1 = M - U_1 \Lambda_1 V_1^H = U_2 \Lambda_2 V_2^H \quad (8)$$

where $U_1$, $\Lambda_1$, and $V_1$ are from the solution of a two streams case.

A reduction in the rank of the channel matrix may be obtained by solving Equation (9) as follows:

$$\max_{\alpha,\beta} \left\{ \det \left\| \begin{bmatrix} A & C \\ B & D \end{bmatrix} \begin{bmatrix} \sqrt{1-\alpha_1^2} v_{1,1} & \sqrt{1-\alpha_2^2} v_{1,2} \\ \alpha_1 e^{i\beta_1} v_{2,1} & \alpha_2 e^{i\beta_2} v_{2,2} \end{bmatrix} \right\|^2 \right\} \quad (9)$$

where $v_1$ and $v_2$ are right singular vectors of $$\left( [A^H \ B^H] \begin{bmatrix} A \\ B \end{bmatrix} \right)$$

and $$\left( [C^H \ D^H] \begin{bmatrix} C \\ D \end{bmatrix} \right),$$

respectively. The final results of $V_2$ and $U_2$ may be updated using Gram Schmidt orthogonalization.

In an embodiment, there may be three or four streams.

Since the best and second best singular value and vectors are obtained, matrix M may be rewritten in Equations (10) and (11) as follows:

$$M = [U_1 \ U_2] \begin{bmatrix} S_1 & 0 \\ 0 & S_2 \end{bmatrix} \begin{bmatrix} V_1^H \\ V_2^H \end{bmatrix} = U_1 S_1 V_1^H + U_2 S_2 V_2^H \quad (10)$$

$$M_1 = M - U_1 S_1 V_1^H = U_2 S_2 V_2^H \quad (11)$$

where $U_1$, $S_1$, and $V_1$ matrices are obtained as described above in the two stream case, with $U_1^H U_2$ and $V_1^H V_2$. $U_1$, $S_1$, and $V_1$ may not be exactly a singular value and singular vectors. Thus, Equation (10) and (11) are not exact but approximations. $U_2$, $S_2$, and $V_2$ may be found as described above in the one stream case, but for 3 streams, and as described above in the two stream case, but for 4 streams. An example for 3 streams is in Equation (12) as follows:

$$\max \left\{ v_2^H \begin{bmatrix} A^H & B^H \\ C^H & D^H \end{bmatrix} \begin{bmatrix} A & C \\ B & D \end{bmatrix} v_2 \right\} = \max \left\{ [\sqrt{1-\alpha^2} v_1^H \ \alpha e^{-i\beta} v_2^H] \right. \quad (12)$$

$$\begin{bmatrix} A^H A + B^H B & A^H C + B^H D \\ C^H A + D^H B & C^H C + D^H D \end{bmatrix} \begin{bmatrix} \sqrt{1-\alpha^2} v_1 \\ \alpha e^{i\beta} v_2 \end{bmatrix} \right\} = \max$$

$$\left\{ (1-\alpha^2) v_1^H (A^H A + B^H B) v_1 + \alpha^2 v_2^H (C^H C + D^H D) v_2 + \right.$$
$$\left. 2\alpha\sqrt{1-\alpha^2} \, \text{Re}\{e^{-i\beta} v_2^H (C^H A + D^H B) v_1\} \right\}$$

$$= \max\{(b-a)\alpha^2 + 2c \cdot \alpha\sqrt{1-\alpha^2} + a\}$$

As described above, the issue is the same as in Equation (5) above. After obtaining $V_t = [V_1 \ V_2]$ and corresponding $U_2$, $V_2$ and $U_2$ are updated using the Gram Schmidt orthogonalization, then $S_t = U_2^H MV_2$ is calculated. To eliminate non-zero values, $[u,s,v] = \text{svd}(S_t)$ is performed. The final result is $v_t = [V_1 \ V_2 v]$ and $U = [U_1 \ U_2 u]$ with proper normalization. The remaining steps are the same as in the one stream and two stream cases.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of non-iterative singular-value decomposition (SVD) in a wireless communication system, comprising:
    receiving, by a receiver, a signal;
    determining, by a channel matrix generator connected to the receiver, a channel matrix for the received signal, where the channel matrix has a dimension of $N_{rx} \times N_{tx}$, where $N_{rx}$ is an integer indicating a number of receive antennas, and $N_{tx}$ is an integer indicating a number of transmit antennas;
    reducing, by a singular-value decomposer connected to the channel matrix generator, the dimension of the channel matrix to $\min(N_{rx},N_{tx}) \times \min(N_{rx},N_{tx})$, where $\min(\ )$ is a function that returns a coefficient with a minimum value;
    performing, by the singular-value decomposer, an SVD on the dimension-reduced channel matrix to determine singular vectors and corresponding coefficients that maximize singular values of the singular vectors;
    outputting a result of the SVD based on at least one of when the dimension of the dimension-reduced channel matrix is less than or equal to 2 and when two greatest singular values of corresponding singular vectors are determined; and
    when the result of the SVD is not output, subtracting, by the singular-value decomposer, the singular vectors from the dimension-reduced channel matrix to reduce rank and returning to performing the SVD.

2. The method of claim 1, wherein reducing the dimension of the channel matrix is comprised of reducing the dimension of the channel matrix by a Givens rotation.

3. The method of claim 1, wherein reducing the dimension of the channel matrix is comprised of reducing the dimension of the channel matrix by a Householder transformation.

4. The method of claim 3, wherein the Householder transformation is performed $N_{rx}$ times.

5. The method of claim 1, wherein $N_{tx}$ is greater than or equal to $N_{rx}$.

6. The method of claim 1, wherein $N_{rx}$ is equal to 1, 2, or 4.

7. The method of claim 1, wherein the SVD is performed at a beamformee and the result of the SVD is fed back to a beamformer.

8. The method of claim 1, wherein the result of the SVD is for single-user multiple-input-multiple output (SU-MIMO).

9. The method of claim 1, wherein the result of the SVD is for multiple-user multiple-input-multiple output (MU-MIMO).

10. The method of claim 1, further comprising updating, by the rank reduction processor, the reduced rank channel matrix using Gram Schmidt orthogonalization.

11. An apparatus for non-iterative singular-value decomposition (SVD) in a wireless communication system, comprising:
   a receiver configured to receive a signal;
   a channel matrix generator connected to the receiver and configured to determine a channel matrix for the received signal, where the channel matrix has a dimension of $N_{rx} \times N_{tx}$, where $N_{rx}$ is an integer indicating a number of receive antennas, and $N_{tx}$ is an integer indicating a number of transmit antennas; and
   a singular-value decomposer connected to the channel matrix generator and configured to:
      reduce the dimension of the channel matrix to $\min(N_{rx}, N_{tx}) \times \min(N_{rx}, N_{tx})$, where $\min()$ is a function that returns a coefficient with a minimum value;
      perform an SVD on the dimension-reduced channel matrix to determine singular vectors and corresponding coefficients that maximize singular values of the singular vectors;
      output a result of the SVD based on at least one of when the dimension of the dimension-reduced channel matrix is less than or equal to 2 and when two greatest singular values of corresponding singular vectors are determined; and
      when the result of the SVD is not output, subtract the singular vectors from the dimension-reduced channel matrix to reduce rank and returning to performing the SVD.

12. The apparatus of claim 11, wherein the singular-value decomposer is further configured to reduce the dimension of the channel matrix by a Givens rotation.

13. The apparatus of claim 11, wherein the singular-value decomposer is further configured to reduce the dimension of the channel matrix by a Householder transformation.

14. The apparatus of claim 13, wherein the singular-value decomposer is further configured to reduce the dimension of the channel matrix by the Householder transformation performed $N_{rx}$ times.

15. The apparatus of claim 11, wherein $N_{tx}$ is greater than or equal to $N_{rx}$.

16. The apparatus of claim 11, wherein $N_{rx}$ is equal to 1, 2, or 4.

17. The apparatus of claim 11, wherein the singular-value decomposer is further configured to perform the SVD at a beamformee and feedback a result of the SVD to a beamformer.

18. The apparatus of claim 11, wherein the singular-value decomposer is further configured to feedback the result of the SVD for single-user multiple-input-multiple output (SU-MIMO).

19. The apparatus of claim 11, wherein the singular-value decomposer is further configured to feedback the result of the SVD for multiple-user multiple-input-multiple output (MU-MIMO).

20. The apparatus of claim 11, wherein the singular-value decomposer is further configured to update the reduced rank channel matrix using Gram Schmidt orthogonalization.

* * * * *